US006194684B1

(12) United States Patent
Clark et al.

(10) Patent No.: US 6,194,684 B1
(45) Date of Patent: Feb. 27, 2001

(54) OUTPUT CHOKE FOR D.C. WELDER AND METHOD OF USING SAME

(75) Inventors: Keith Leon Clark, Concord; Brian Keith Housour, Chardon, both of OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/563,984

(22) Filed: May 3, 2000

Related U.S. Application Data

(63) Continuation of application No. 09/534,583, filed on Mar. 27, 2000, which is a continuation of application No. 09/184,149, filed on Nov. 2, 1998, now abandoned.

(51) Int. Cl.[7] .................................................. B23K 9/10
(52) U.S. Cl. ................................ 219/137 PS; 219/130.1
(58) Field of Search ......................... 219/130.1, 137 PS, 219/130.51

(56) References Cited

U.S. PATENT DOCUMENTS

| | | | | |
|---|---|---|---|---|
| 1,353,711 | * | 9/1920 | Bergman | 219/130.1 |
| 2,469,266 | | 5/1949 | Howell . | |
| 3,091,720 | | 5/1963 | Huberty . | |
| 3,136,884 | * | 6/1964 | Glenn et al. | 219/130.1 |
| 3,211,953 | * | 10/1965 | Gibson et al. | 219/130.51 |
| 3,308,265 | * | 3/1967 | Hobart | 219/130.51 |
| 3,546,571 | | 12/1970 | Fletcher et al. . | |
| 3,911,243 | * | 10/1975 | Moriyama et al. | 219/130.1 |
| 4,117,303 | * | 9/1978 | Hedberg | 219/130.1 |
| 4,398,080 | * | 8/1983 | Johansson et al. | 219/130.1 |
| 4,547,705 | | 10/1985 | Hirayama et al. . | |
| 5,194,817 | | 3/1993 | Ward . | |
| 5,204,653 | | 4/1993 | Saitoh et al. . | |
| 5,440,225 | | 8/1995 | Kojima . | |
| 5,461,555 | | 10/1995 | Kitajima et al. . | |
| 5,816,894 | | 10/1998 | Hosozawa et al. . | |

FOREIGN PATENT DOCUMENTS

| | | |
|---|---|---|
| 28 48 119 | 5/1980 | (DE) . |
| 0 039 485 | 11/1981 | (EP) . |
| 0 729 040 | 8/1996 | (EP) . |
| 229484 | 2/1925 | (GB) . |
| 182260 | 2/1983 | (HU) . |
| 53-8344 | 1/1978 | (JP) . |
| 3-208250 | 9/1991 | (JP) . |

* cited by examiner

*Primary Examiner*—Clifford C. Shaw
(74) *Attorney, Agent, or Firm*—Vickers, Daniels & Young

(57) ABSTRACT

An output choke for a D.C. arc welder comprising a high permeability core with an inductance controlling air gap defined by first and second pole pieces terminating in first and second surfaces facing each other and each having two spaced edges with an intermediate area, said surfaces converging from said intermediate area toward each of said edges to generate a specific cross sectional shape for said gap wherein said choke is large enough to carry at least about 100 amperes of weld current.

27 Claims, 5 Drawing Sheets

OUTPUT CHOKE FOR D.C. WELDER AND METHOD OF USING SAME

This patent application is a continuation of application Ser. No. 09/534,583 filed on Mar. 27, 2000, pending, which is a continuation of application Ser. No. 09/184,149 filed on Nov. 2, 1998, now abandoned, and incorporated herein by reference.

The present invention relates to an output choke for a D.C. arc welder and a method of controlling the inductance in the output circuit of a D.C. electric welder using such choke.

BACKGROUND OF INVENTION

In D.C. electric arc welders, the output circuit normally includes a capacitor in parallel across the electrode and workpiece with a relatively small inductance for charging the capacitor as the rectifier or power supply provides D.C. current. This inductance removes the ripple from the welding current. In series with the arc gap of the welder there is provided a large choke capable of handling high currents over about 50 amperes and used to control current flow for stabilizing the arc. As the feeding speed of the electrode toward the workpiece and the length of the arc change, the welding current varies. In the past, the large output choke in series with the arc had a fixed air gap in the core to control the inductance at a fixed value as current changes. However, when the choke experienced high weld currents, the core saturated and reduced the inductance drastically. For this reason, the width of the air gap in the core was enlarged to provide constant inductance over the operating current range of the welder. The choke was selected for a particular operating current range. However, this range would vary for different welding operations. Thus, the air gap of the choke was selected for the majority of welding operations. In a standard choke, a small air gap provided high inductance, but would saturate at relatively low currents. To increase the current capacity of the choke, the air gap was enlarged to reduce the amount of inductance for a particular size of the choke. For these reasons, the choke was made quite large with large wires to carry the weld current and a large cross sectioned core to prevent saturation. The gap was large to accommodate a wide range of welding currents. Such chokes were expensive and drastically increased the weight of the welder. Further, the choke produced a constant inductance until the saturation point or knee, even though ideal arc welding is realized with an inductance that is inversely proportional to the weld current. To alleviate these problems, it has been suggested that the air gap could include two or three different widths. This suggestion produced a high inductance until the small air gap saturated. Thereafter, a lower inductance would be realized until the larger air gap saturated. By using this concept of two, or possibly three, stepped air gaps, the size of the choke could be reduced and the range of current controlled by the choke could be increased. Further, the relationship of current to inductance was inverse. The concept of using a stepped air gap in the core of the output choke allowed a smaller choke; however, one or more inflection points existed. When the feed speed of the electrode or arc length changed to operate in the area of the inflection points, the D.C. welder would oscillate about the saturation or inflection points causing unstable operation. A standard swinging choke was not the solution because the weld current varied too much to operate on the saturation knee. In addition, such swinging chokes were for small current applications.

The use of a fixed output choke for a D.C. arc welder is now standard. Such choke is large and the operating point is in the linear portion of the inductance preventing drastic reductions in the output inductance of the welder. Such choke is expensive and heavy. By the procedure of having a stepped air gap, the size of the choke could be reduced and the current operating range increased; however, the inflection point at the saturation of one gap, made the welder less robust and susceptible to oscillation at certain arc lengths and feed speeds. Consequently, this suggested modification was not commercially acceptable.

THE INVENTION

The present invention relates to an output choke for a D.C. arc welder which solved the problems of weight, cost and welding inconsistencies experienced by a large choke having a fixed air gap or a smaller choke having a stepped air gap. In accordance with the invention, the output choke for the D.C. arc welder comprises a high permeability core with an area having a cross sectional shape with two spaced edges and an air gap wherein the air gap has a gradually converging width for at least a portion of the distance between the two edges. Thus, the air gap gradually increases from the edges. In the preferred embodiment, the air gap is a diamond shape, gradually increasing from the edges to the center portion of the core. This diamond core technology for the output choke of a D.C. welder produces an inductance in the output circuit which gradually varies over the current range in an inverse relationship with the weld current. As the welding current increases, the inductance decreases in a continuous manner without any discontinuity or steps. Thus, the weld current is never at a saturation point for the output choke or operating on the saturation knee. There is no oscillation of the power to the weld. This invention produces a robust welder which can handle changes and up to 5–10 volts with arc length changes without causing instability of the arc. Thus, the choke provides current control over a wide range of weld currents without oscillating or without the need for a large output choke.

In accordance with another aspect of the present invention the output choke includes a high permeability core with an air gap defined by first and second pole pieces terminating in first and second surfaces facing each other. Each of these surfaces has two spaced apart edges with an intermediate area with the facing surfaces converging from the intermediate area toward the respective edges of the surfaces to generate a specific cross sectional shape for the air gap. This cross sectional shape is preferably a diamond; however, it may be an oval or other curvilinear shape so long as there is gradual changes in the inductance with changes in weld current. In the preferred diamond shape air gap, the intermediate area is in the center of the pole pieces; however, the intermediate area may be closer to one edge of the facing surfaces. This provides a non-equilateral diamond. In accordance with another aspect of the invention, the gap may have a shape which converges from one edge of the facing surfaces toward the other edge of the facing surfaces. This provides an air gap having the shape of a triangle. All of these configurations result in a choke where the inductance gradually changes with the output current of the welder without saturation between adjacent areas causing inflection points that can result in hunting or oscillation of the welder at certain wire speeds and arc lengths.

Another aspect of the present invention is the provision of a method of controlling the inductance in the output circuit of a D.C. electric arc welder operated over a given current range to weld by passing a weld current in the gap between an electrode and a workpiece. This method comprises: providing an inductor with a generally constant inductance over the current range for charging a capacitor connected in parallel with the welding gap or arc; providing an output choke with an inductance gradually varying over the current range; and, connecting the choke in series with the gap or arc and between the arc and the capacitor. In this method, the inductance varies in a generally straight line inversely proportional to the weld current so that as current increases the inductance gradually decreases along a generally straight line. This is an optimum relationship for arc welding. Generally straight includes concave or convex linear relationship so long as there is no inflection points along the curve as are caused by stepped air gaps.

The present invention relates to an arc welder which requires a relatively large output choke. This field is distinguished from power supplies used for low power appliances, such as lights, sound or video equipment. Such miniature power supplies do not have the large currents or the large range of currents needed for arc welding. An arc welder involves currents exceeding 50 amperes. Indeed, the choke of the present invention is a choke that can handle currents of 100–500 amperes while still maintaining an unsaturated core. The invention handles at least about 100 amperes. This clearly distinguishes the output choke of the present invention from other inductors used in power supplies.

The present invention is directed to the arc welding field where the optimum operation involves an inverse relationship between the inductance and weld current. Small inductors are usually used where the optimum operating characteristic between current and inductance is linear. To provide operation in an inverse relationship between current and inductance, such small inductors are operated on the knee of the saturation curve. This provides an inductance that is maximum for small current and swings to a lower value as the current increases. Such inductors are referred to as "swinging reactors"; however, they operate over a relatively small current range at the knee of the magnetic saturation curve and normally are sized to handle small currents less than 10 amperes. Such small swinging reactor could not be successful for the output choke of a D.C. welder since the current range is quite large and the weld currents are extremely large, over about 50 amperes.

The primary object of the present invention is the provision of an output choke for a D.C. arc welder, which choke has a gradually varying inductance over a wide current range and is capable of handling currents exceeding about 50 amperes and normally in the range of 100–500 amperes.

Still a further object of the present invention is the provision of an output choke for a D.C. arc welder, as defined above, which choke produces no inflection points and does not cause the power supply to oscillate as the wire feed speed is changed or as the arc length is changed.

Still a further object of the present invention is the provision of an output choke for a D.C. arc welder, as defined above, which choke has no areas of non-linearity and can operate over a wide weld current range without saturation.

Yet another object of the present invention is the provision of an output choke for a D.C. arc welder which has a generally straight line relationship between current and inductance over a wide range of welding currents and the method of controlling the inductance in the output circuit of a D.C. electric arc welder using this choke.

Still a further object of the present invention is the provision of an output choke for a D.C. arc welder and method of using same, as defined above, which allows for high inductance at low wire feed speed and low inductance at high wire feed speeds without transition from one saturation curve to another saturation curve for the choke.

Another object of the present invention is the provision of an output choke for a D.C. arc welder which has a diamond shape air gap to control the current-inductance relationship.

These and other objects and advantages will become apparent from the following description taken together with the accompanying drawings.

PREFERRED EMBODIMENTS

Figure 1:
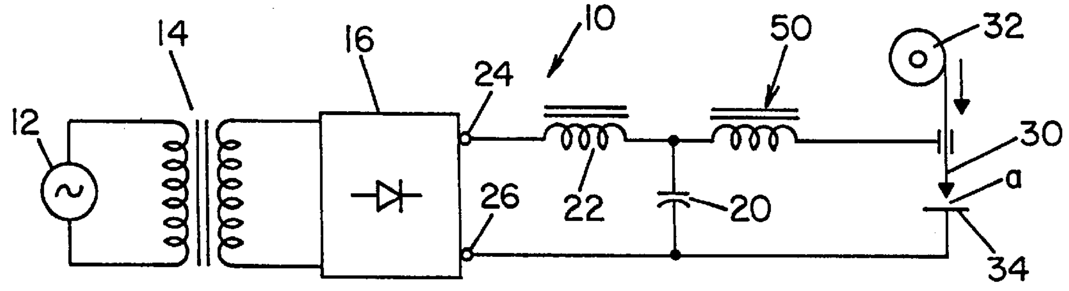
FIG. 1 is a schematic wiring diagram of a D.C. arc welder having an output circuit using the present invention.
Figure 2:
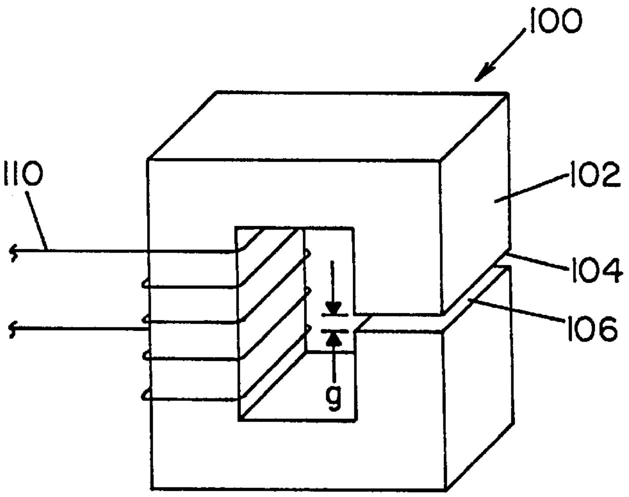
FIG. 2 (PRIOR ART)
FIG. 2 is a pictorial view showing schematically a standard, prior art output choke for a D.C. welder.
Figure 3:
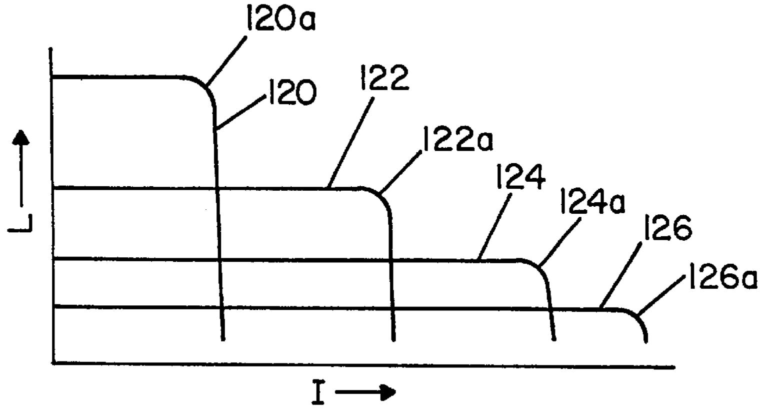
FIG. 3 is a current-inductance graph showing the saturation curves for various air gaps used in the prior art choke schematically illustrated in FIG. 2.
Figure 4:
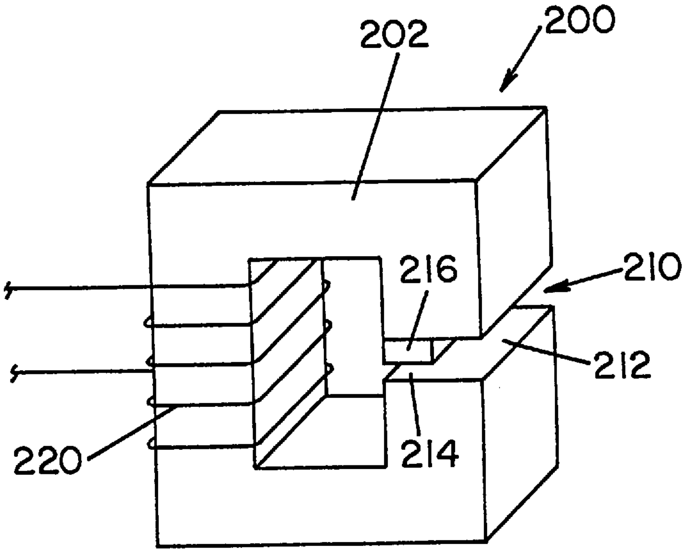
FIG. 4 is a pictorial view showing schematically an output choke for a D.C. welder which has been suggested for correcting the problems of the prior art choke illustrated schematically in FIG. 2.
Figure 5:
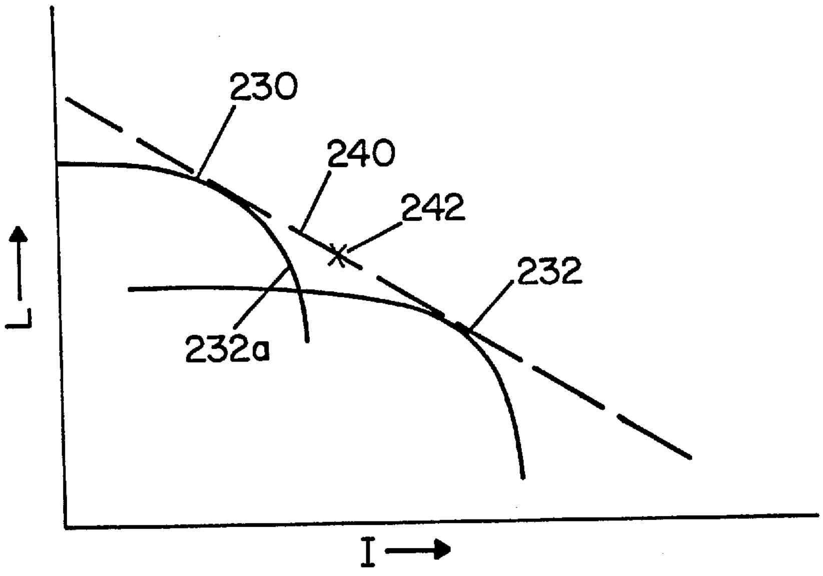
FIG. 5 is a current-inductance graph showing the saturation curve for the choke illustrated schematically in FIG. 4.
Figure 6:
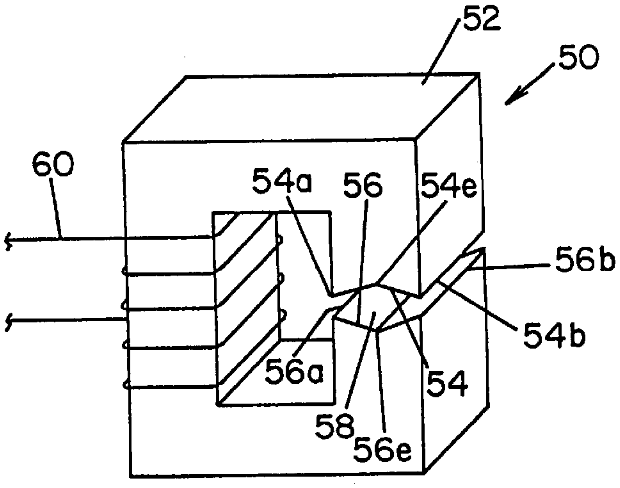
FIG. 6 is a pictorial view of an output choke for a D.C. welder constructed in accordance with the preferred embodiment of the present invention.

Referring now to the drawings, wherein the showings are for the purpose of illustrating preferred embodiments of the invention only and not for the purpose of limiting same, FIG. 1 shows a D.C. electric arc welder 10 capable of creating a welding current of at least about 50 amperes and up to 200–1,000 amperes. Power source 12, shown as a single phase line voltage, is directed through transformer 14 to rectifier 16. Of course, the rectifier could be driven by a three phase power source to create a D.C. voltage. In accordance with standard practice, a capacitor 20 having a size of about 20 K–150 K micro farads is charged by inductor 22 having a size of approximately 20 mH. Rectifier 16 charges capacitor 20 through inductor 22, which inductor may be replaced by inductance of the transformer. Output voltage from rectifier 16 at terminals 24, 26 is the voltage across capacitor 20 that maintains a voltage across arc gap $\alpha$ between electrode 30 from a wire feeder 32 and workpiece 34. To maintain an even flow of current across arc $\alpha$, a relatively large output choke 50 is provided in the output circuit between capacitor 20 and gap or arc $\alpha$. The invention involves the construction and operation of current control output choke 50, as best shown in FIG. 6. In the past, the output choke was a large choke as schematically shown in FIG. 2 wherein choke 100 has a high dependability core 102 with an air gap g defined between two facing surfaces 104, 106. The high currents demand large wires for winding 110. To obtain high inductance, the number of turns is high. To prevent saturation the cross section of core 102 is large. Thus, choke 100 is large, heavy and expensive. By changing the width of gap g between surfaces 104, 106, core 102 is saturated by high weld currents in winding 110 by saturation curves, as shown in the graphs of FIG. 3. When air gap g is relatively small for a given choke, a high inductance is created; however, at low weld currents the core is saturated. This is shown in saturation curve 120. As the width of gap g is increased, the inductance is decreased and saturation current is increased. This relationship of an increased gap size is indicated by saturation curves 122, 124 and 126. Each of the saturation curves has saturation knees or points 120*a*, 122*a*, 124*a* and 126*a*, respectively. When operating arc welder 10 with a fixed air gap, as shown in FIG. 2, a saturation curve must be selected to accommodate the desired welding currents. To produce both a high inductance and a large current range, the windings 110 must be increased and the core size must be increased. This drastically increases the size and weight of the choke. By decreasing the weight and size of the choke the saturation curve has a reduced saturation current which causes erratic operation of the D.C. welder. In order to correct the problems associated with an output choke having a fixed gap for controlling the current in the output circuit of a D.C. arc welder, it has been suggested to use a choke as shown schematically in FIG. 4. Choke 200 includes a high permeability core 202 having an air gap 210. In this choke, the air gap is stepped with a large gap 212 and a small gap 214 created by adding a small pole piece 216. When currents exceeding 100–500 amperes are passed through winding 220, the inductance follows a two part saturation curve as shown in FIG. 5. This non-linear curve includes a first portion 230 employed until gap 214 is saturated and then a second portion 232 employed until larger gap 212 is saturated. These two sections create an effective current-inductance relationship illustrated by dashed line 240. This inverse current-inductance is extremely beneficial in electric arc welding. The two part curve accommodates both low current and high current operation. However, there is an abrupt saturation knee 232*a* causing an inflection point 242. As the arc welder operates along line 240, inflection point 242 causes oscillation as the wire feed speed is changed or the arc length or arc voltage is changed. Thus, there is a hunting action in the area of the inflection point 242 which reduces the effectiveness of the suggested stepped air gap approach shown schematically in FIG. 4.

Figure 7:
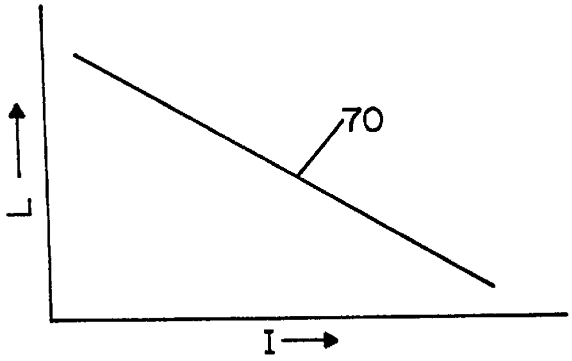
FIG. 7 is a current-induction graph for the preferred embodiment of the present invention as illustrated in FIG. 6.
Figure 8:
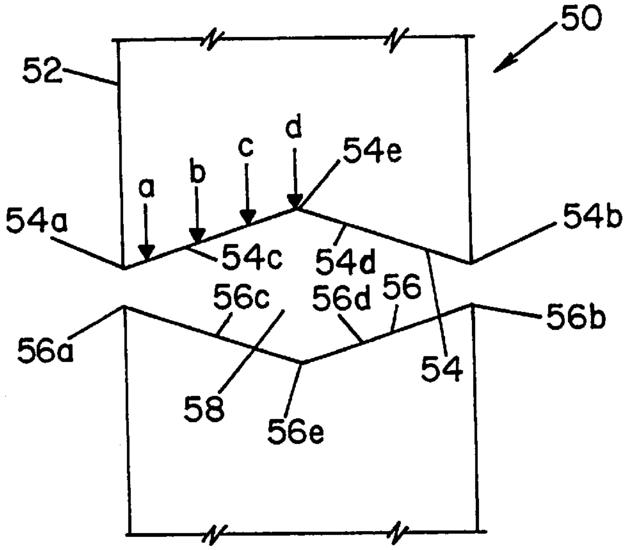
FIGS. 8, 9 and 10 are partial views of the core and air gaps having shapes using the preferred embodiment of the present invention.

Choke 50 of FIG. 1 incorporates the preferred embodiment of the present invention as illustrated in FIGS. 6–8. Core 52 of high permeability material has a cross section large enough to prevent saturation at over 50 amperes and preferably over 100–500 amperes. Facing surfaces 54, 56 of core 52 are between spaced edges 54*a*, 54*b* and 56*a*, 56*b*. The respective transversely spaced edges face each other and provide a relatively small air gap, if any. The center area 58 between surfaces 54, 56 constitutes a large air gap. This diamond shape air gap is between the spaced edges of faces 54, 56 and is defined by portions 54*c*, 54*d* of surface 54 and 56*c*, 56*d* of surface 56. These portions diverge together from a maximum air gap at apex 54*e* and apex 56*e* of the diamond shaped air gap. A winding 60, having a size to carry the weld current and a turn number to obtain the desired inductance, conducts the welding current around core 52. By using the diamond shaped air gap as shown in FIG. 6, with the selected core size and turn number, current-inductance curve 70 in FIG. 7 is obtained. Curve 70 represents an ideal current-inductance relationship for electric arc welding when the current progresses from 20 amperes to a high level exceeding about 200 amperes and often exceeding 500–1,000 amperes. As shown in FIG. 8, the small air gap at edges 54*a*, 56*a* and 54*b*, 56*b* tends to saturate at low currents. As the current increases, the diamond shaped air gap in choke 50 cannot saturate. At high levels the choke attempts to saturate an extremely large air gap. As indicated by the arrows, the saturation of the core by flux through the diamond shaped air gap would saturate the smaller gaps at position a, but not progressing upward from points b, c, d. The apex of the diamond shaped air gap is selected to prevent saturation even at maximum weld current. Thus, there is a straight line relationship between current and inductance, which relationship is gradual and continuous by the use of the diamond shaped air gap.

Figure 9:
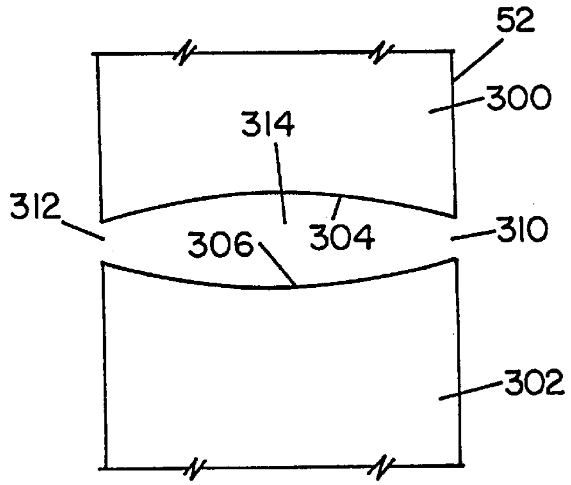
Figure 10:
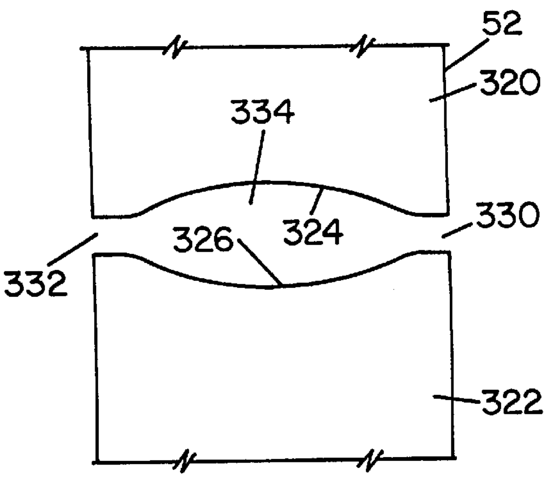
Figure 11:
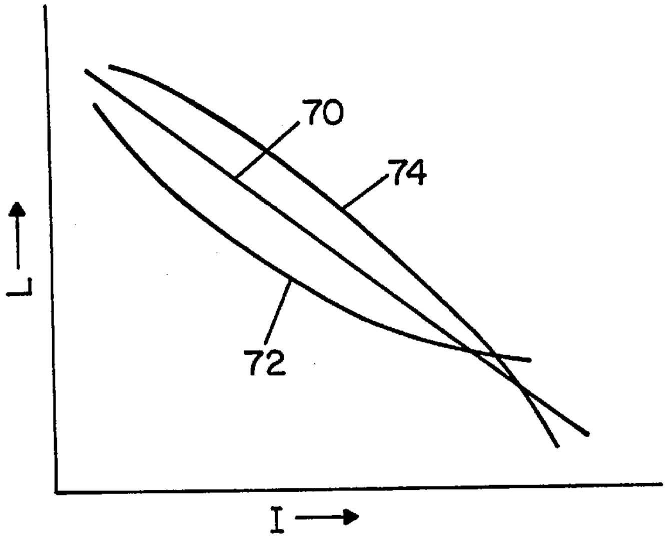
FIG. 11 is a current-inductance graph similar to FIG. 7 showing the operating curve for the embodiments of the invention shown in FIGS. 8–10.

Two other preferred embodiments using the diamond air gap concept are illustrated in FIGS. 9 and 10. In FIG. 9, pole pieces 300, 302 of the core 52 have facing surfaces 304, 306 which are arcuate in shape to create an oval or elliptical air gap. This air gap includes small air gaps 310, 312 and a large center air gap at area 314. This preferred embodiment of the invention provides a linear curve 72 which is slightly concave, as shown schematically in FIG. 11. A generally linear, but convex, curve 74 is created by the preferred embodiment of the invention illustrated generally in FIG. 10 wherein core 52 includes pole pieces 320, 322 with facing surfaces 324, 326, respectively. These surfaces are curvilinear with small air gaps 330, 332 separated by an enlarged air gap at center portion 334. As can be seen, the preferred embodiments of the invention gradually change the width of the air gap from the center of the core to the outside edges of the core. The optimum application of the preferred embodiment is the diamond shaped air gap, as best shown in FIGS. 6 and 8. The oval air gap of FIG. 9 and the curvilinear air gap of FIG. 10 also provide a relatively straight, inversely proportional curve for the relationship between the current and inductance of the large current controlled by choke 50 used in a D.C. arc welder as illustrated in FIG. 1.

Figure 12:
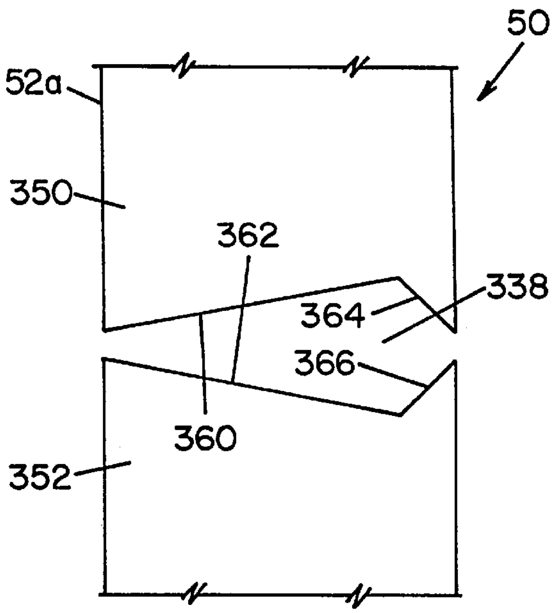
FIGS. 12 and 13 are partial view of the core of the choke showing air gaps having shapes which are modifications of the preferred embodiments of the present invention as shown in FIGS. 8–10; and, FIG. 14 is a partial view of the core of an electrode constructed in accordance with the present invention wherein the preferred diamond air gap shape is obtained by two core pieces which touch each other and are affixed.
Figure 13:
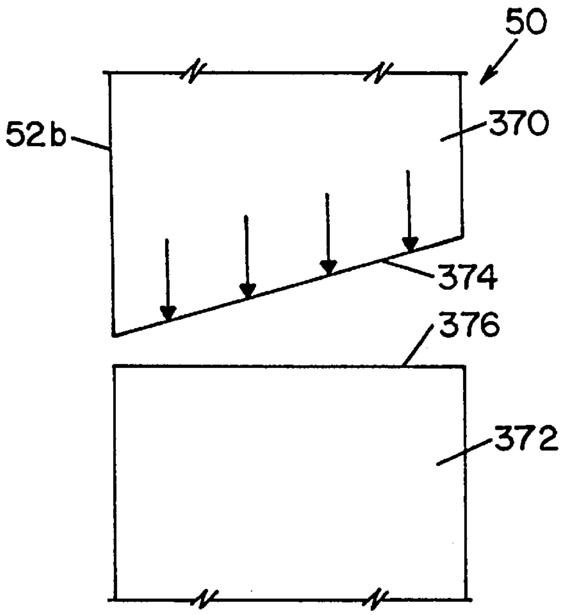

In the preferred embodiments, the air gap is gradually converging and is symmetrical with respect to the core. It is possible to provide an asymmetrical air gap configuration as shown in FIGS. 12 and 13. In FIG. 12, core 52*a* of choke 50 includes pole pieces 350, 352 with facing surfaces having converging portions 360, 362 and 364, 366. These portions define a large air gap area 338, which area is slightly offset from the center of the core. Another asymmetric air gap configuration is shown in FIG. 13 wherein core 52*b* includes pole pieces 370, 372 with a angled surface 374 and a straight surface 376. The air gap shown in FIG. 13 is also accomplished by forming pole piece 370 with a flat perpendicular surface, but tilting it with respect to pole piece 372. These structures produce an air gap with a small portion on the left and a large portion on the right. These two asymmetric air gaps produce better results than the stepped air gap 210 in FIG. 4; however, they do not obtain the desirable effects shown in FIG. 11 as accomplished by the symmetric air gap 10 configurations shown in the preferred embodiments of FIGS. 8–10.

Figure 14:
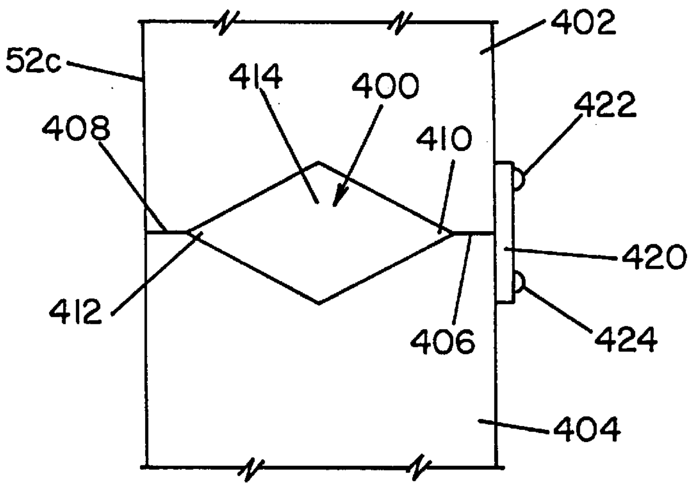

In practice, choke 50 has a core 52*c* as illustrated in FIG. 14. A diamond shaped symmetrical air gap 400 is provided between pole pieces 402, 404 with the abutting edge portions 406, 408 touching each other to define the intermediate air gap 400 with small gap portions 410, 412 gradually increasing to a large gap portion 414. Pole pieces 402, 404 are joined by a strap 420 using appropriate pins 422, 424. Air gap 400 is a diamond shaped air gap, which air gap is large at the apex or center and decreases toward both edges of the core. This diamond shaped air gap provides a generally straight line, inversely proportional relationship between current and inductance, which relationship is optimum for electric arc welding. A low permeability potting material can fill air gap 400 when the choke is packaged for use in the field.

Having thus defined the invention, the following is claimed:

1. A method of controlling the inductance in the output circuit of a D.C. electric arc welder operated over a given current range as a weld current is applied to a gap between an electrode and a workpiece, said method comprising:

a) providing an inductor with a generally constant inductance over said current range for charging a capacitor connected in parallel with said gap;

b) providing a choke having at least one winding, said choke having an inductance that gradually varies over said current range, said choke comprising a high permeability core having first and second pole pieces and an inductance controlling air gap, said air gap defined by end surfaces on said first and second pole pieces, said end surfaces being spaced from one another and facing one another, said end surfaces of said first and second pole pieces having corresponding inner and outer edges and a middle portion between said inner and outer edges, at least a portion of the middle portion of said corresponding end surfaces being spaced apart at a varying distance to vary the inductance of said choke over a current range, at least a portion of the middle portion of said end surfaces being spaced apart a distance greater than the distance between said inner and outer edges of said end surfaces; and, c) connecting said choke in series with said gap and between said gap and said capacitor.

2. The method as defined in claim 1, wherein said inductance of said choke varies generally inversely proportional to said weld current.

3. The method as defined in claim 2, wherein said inductance of said choke varies in a generally straight line to said weld current.

4. The method as defined in claim 2, wherein said inductance of said choke varies in curvilinearly to said weld current.

5. The method as defined in claim 1, including the step of directing a weld current of at least about 50 amperes through said winding and across said gap.

6. The method as defined in claim 1, wherein said middle portion of said corresponding end surfaces being spaced apart at a varying distance to substantially gradually vary the inductance of said choke over a current range, said inner and outer edge space selected to substantially prevent inflection points along the saturation curve of said choke.

7. The method as defined in claim 1, wherein each of said end surfaces has a cross-sectional shape, said cross-sectional shape of said end surfaces being symmetrical.

8. The method as defined in claim 1, wherein said air gap formed by said middle portions of said end surfaces is generally diamond shaped.

9. The method as defined in claim 1, wherein said air gap formed by said middle portions of said end surfaces is generally oval shaped.

10. The method as defined in claim 1, wherein at least a portion of said middle portion of at least one end surface includes a curvilinear surface portion.

11. The method as defined in claim 1, wherein at least one of said end surface of said first pole piece having a middle portion positioned between said inner and outer edges, said middle portion having substantially non-perpendicular oriented surfaces.

12. The method as defined in claim 1, wherein each of said end surfaces has a cross-sectional shape, said cross-sectional shape of said end surfaces being symmetrical.

13. The method as defined in claim 1, including the step of filling said air gap with a low permeability material.

14. The method as defined in claim 1, including the step of p roving a core and windings on said core of said choke to prevent saturation at a weld current of at least about 100 amperes.

15. A method of controlling the inductance in the output circuit of a D.C. electric arc welder operated over a given current range as a weld current is applied to a gap between an electrode and a workpiece, said method comprising:

a) providing an inductor with a generally constant inductance over said current range for charging a capacitor;

b) providing a choke having at least one winding, said choke having an inductance that gradually varies over said current range, said choke comprising a high permeability core having first and second pole pieces and an inductance controlling air gap, said air gap defined by an end surface on said first and second pole pieces, said end surfaces facing one another, said end surfaces of said first and second pole pieces having corresponding inner and outer edges, said end surfaces of said first and second pole pieces having a middle portion positioned between said inner and outer edges, at least a portion of the middle portion of said end surfaces being spaced apart a distance greater than the distance between said inner and outer edges of said end surfaces; and, c) connecting said choke in series with said gap and between said gap and said capacitor.

16. The method as defined in claim 15, wherein each of said end surfaces has a cross-sectional shape, said cross-sectional shape of said end surfaces being symmetrical.

17. The method as defined in claim 16, wherein at least a portion of said intermediate surface on at least one end surface includes a curvilinear surface portion.

18. The method defined in claim 15, wherein said air gap formed by said intermediate surfaces of said end surfaces is generally diamond shaped.

19. The method as defined in claim 15, wherein said air gap formed by said intermediate surfaces of said end surfaces is generally oval shaped.

20. The method as defined in claim 15, wherein at least a portion of said intermediate surface on at least one end surface includes a curvilinear surface portion.

21. The method as defined in claim 15, wherein said air gap is filled with a low permeability material.

22. The method as defined in claim 15, wherein said choke includes a winding for conducting welding current, said winding and said core are sized to prevent saturation at a weld current of at least about 100 amperes.

23. The method as defined in claim 15, wherein said end surfaces being spaced from one another.

24. The method as defined in claim 15, wherein said at least a portion of the middle portion of said corresponding end surfaces being spaced apart at a varying distance to substantially gradually vary the inductance of said choke over a current range.

25. The method as defined in claim 15, wherein said inner and outer edge spacing is selected to substantially prevent inflection points along the saturation curve of said choke.

26. The method as defined in claim 15, wherein said inner and outer edges of said end surfaces of said first and second pole pieces being spaced apart at generally the same distance.

27. The method as defined in claim 15, wherein said gap has a gradually converging width for at least a portion of the distance between said first and second ends of said two pole pieces.

* * * * *